(12) United States Patent
Qian et al.

(10) Patent No.: US 9,340,190 B2
(45) Date of Patent: May 17, 2016

(54) DISK BRAKE WITH A PARKING BRAKE, MECHANICAL THRUST ASSEMBLY, AND METHOD OF ASSEMBLING

(71) Applicant: CHASSIS BRAKES INTERNATIONAL B.V., VM Amsterdam (NL)

(72) Inventors: Nan Qian, Paris (FR); Philippe Bourlon, Dammartin en Goele (FR)

(73) Assignee: CHASSIS BRAKES INTERNATIONAL B.V., Amsterdam (NL)

( * ) Notice: Subject to any disclaimer, the term of this patent is extended or adjusted under 35 U.S.C. 154(b) by 0 days.

(21) Appl. No.: 14/102,834

(22) Filed: Dec. 11, 2013

(65) Prior Publication Data

US 2014/0158480 A1 Jun. 12, 2014

(30) Foreign Application Priority Data

Dec. 12, 2012 (FR) ...................... 12 61935

(51) Int. Cl.
| | |
|---|---|
| *F16D 65/12* | (2006.01) |
| *B60T 11/10* | (2006.01) |
| *B60T 1/06* | (2006.01) |
| *B60T 11/04* | (2006.01) |
| *F16D 55/226* | (2006.01) |
| *F16D 121/04* | (2012.01) |
| *F16D 121/24* | (2012.01) |
| *F16D 123/00* | (2012.01) |
| *F16D 125/06* | (2012.01) |
| *F16D 125/40* | (2012.01) |

(52) U.S. Cl.
CPC ............... *B60T 11/102* (2013.01); *B60T 1/065* (2013.01); *B60T 11/04* (2013.01); *F16D 55/226* (2013.01); *F16D 2121/04* (2013.01); *F16D 2121/24* (2013.01); *F16D 2123/00* (2013.01); *F16D 2125/06* (2013.01); *F16D 2125/40* (2013.01); *F16D 2250/0084* (2013.01)

(58) Field of Classification Search
CPC  F16D 55/226; F16D 2121/04; F16D 2121/24
See application file for complete search history.

(56) References Cited

U.S. PATENT DOCUMENTS

| | | | |
|---|---|---|---|
| 6,422,354 B1 * | 7/2002 | Shaw et al. ................. | 188/72.8 |
| 7,721,853 B2 | 5/2010 | Chittka | |

(Continued)

FOREIGN PATENT DOCUMENTS

| | | |
|---|---|---|
| DE | 10 2007 051456 | 4/2009 |
| DE | 10 2010 029680 | 5/2011 |
| EP | 2174037 | 4/2010 |

OTHER PUBLICATIONS

French Search Report dated Oct. 28, 2013, corresponding to the Foreign Priority Application No. 1261935.

*Primary Examiner* — Bradley King
(74) *Attorney, Agent, or Firm* — Young & Thompson

(57) ABSTRACT

An arrangement contains a brake piston for operating at least one disk brake pad and a nut-and-screw unit for producing an axial thrust, from the rear to the front, of the piston containing a nut arranged in the piston's interior, and secured thereto to prevent rotation, and mounted therein to slide axially, whose front axial end face interacts with an internal section facing the piston's front wall to push the piston axially towards the front when the screw is rotatably driven in the unscrewing direction, and the screw containing a front section screwed into the nut, an intermediate radial flange and a rear section, wherein the piston screw contain centering elements that interact with one another when the screw is in a predetermined front axial mounting position in relation to the piston in order to center the rear section of the screw radially in relation to the piston.

13 Claims, 8 Drawing Sheets

(56) References Cited

U.S. PATENT DOCUMENTS

| | | | |
|---|---|---|---|
| 7,810,616 B2* | 10/2010 | Nakazeki | 188/72.8 |
| 8,061,491 B2* | 11/2011 | Tristano et al. | 188/265 |
| 8,607,939 B2* | 12/2013 | Osterlanger et al. | 188/72.8 |
| 8,733,512 B2* | 5/2014 | Kim | 188/72.1 |
| 2005/0258682 A1* | 11/2005 | Halasy-Wimmer et al. | 303/89 |
| 2007/0045062 A1* | 3/2007 | Watada | 188/72.8 |
| 2007/0068746 A1 | 3/2007 | Chittka | |
| 2011/0315007 A1 | 12/2011 | Koch et al. | |

* cited by examiner

DISK BRAKE WITH A PARKING BRAKE, MECHANICAL THRUST ASSEMBLY, AND METHOD OF ASSEMBLING

TECHNICAL FIELD OF THE INVENTION

The present invention relates to a hydraulically operated disk brake intended for a motor vehicle and containing an electromechanically operated parking brake, or brake for "parking".

The invention relates in particular to an arrangement containing a hydraulic brake piston for the operation of at least one disk brake pad and a nut-and-screw unit for the mechanical axial thrusting of this piston.

The invention further relates to a method of mounting such an arrangement in a disk brake caliper.

DESCRIPTION OF THE PRIOR ART

The general construction of a hydraulically controlled disk brake containing an electromechanical parking brake is already familiar, in particular from documents EP-B1-2.174.037 or U.S. Pat. No. 7,721,853.

In a known manner, the brake contains a caliper that is capable of supporting and guiding two opposing sliding friction pads that are capable of interacting with a rotating disk.

The caliper contains a rear housing, mounted inside which in an axially sliding manner is the hydraulic piston that is capable of interacting with an associated disk brake pad in order to apply to the latter an axial thrust, from the rear to the front, when the hydraulic chamber (that the piston delimits together with the associated cavity in which it is received with a sealed sliding movement) is supplied with a fluid under pressure.

Regardless of the principal hydraulic operation of the disk brake, the latter also contains electromechanical means for its operation and its function as a parking brake.

For this purpose, the brake contains a nut-and-screw combination or unit that is arranged in the brake piston and in the cavity for receiving the piston and, on the other hand, an electric geared motor assembly for driving the screw of the nut-and-screw unit in a rotational manner in both directions.

The nut is housed in the interior of the piston, in relation to which it is secured in order to prevent rotation and inside which it is mounted so as to slide axially.

A front axial end face of the nut interacts with an internal section facing the front radial wall of the piston in order to push the latter axially towards the front.

For this purpose, the screw contains a front section that is mounted by screwing into the nut, an intermediate radial flange and a rear section having a free extremity that constitutes in particular the head for driving the screw in a rotating manner.

In a known manner, the screw is secured axially in relation to the transverse bottom wall of the cavity formed in the housing for the caliper, and the screw is guided in a rotating manner in relation to this wall.

For this purpose, the rear section of the screw passes through a transcurrent opening in the bottom wall, in which it is guided rotatably in a sealed manner.

The transverse rear face of the intermediate flange is in axial abutment, with the interposition of a bearing, against a radial abutment seat formed in the internal face of the bottom wall of the cavity, and the rear free extremity of the rear section, which projects axially beyond the bottom wall, is secured axially, for example, by means of an elastic split ring accommodated in a supplementary radial groove of the screw.

The transverse rear face of the intermediate flange is thus a functional plane machined face that constitutes the axial abutment face of the screw under load.

The operation of the brake in the parking function is obtained by driving the screw in a rotating manner in relation to the nut and to the piston, the latter being secured against rotation in relation to the caliper, for example, in the direction of unscrewing, in order to bring about an axial movement towards the front of the nut, which, as a result, pushes towards the associated front piston.

In order to ensure the sealed guiding of the rear section of the screw as it rotates and thus the hydraulic tightness towards the rear of the hydraulic chamber for controlling the brake piston, an annular seal is provided that is interposed radially between the guide hole of the rear section of the screw and the latter.

Assembly of the arrangement constituted by the brake piston and the nut-and-screw unit takes place, in particular in an automated manner in industrial production, by introducing this arrangement axially, from the front to the rear, into the cavity in the rear housing of the caliper.

This arrangement contains in particular the rear end section of the screw that projects axially towards the rear in relation to the piston and must be introduced into the guide hole in the bottom wall of the cavity, and in particular through the annular seal.

According to the various known designs, the transverse position, in the radial direction, of the rear section of the screw in relation to the piston, and accordingly in relation to the cavity, is indeterminate as a result of the design and, in particular, the clearances necessary for the function of the mechanical thrusting means.

Mounting difficulties, or even impossibilities, result when the transverse face of the rear extremity of the rear section of the screw comes into abutment against a portion facing the bottom of the cavity, and, for example, against the machined internal face of the bottom wall, or possibly even against the annular seal.

In addition to this impossibility of mounting, such entry into contact may result in damage to the rear section of the screw, the portion facing the wall, the joint, or possibly even an axial ring for guiding the screw that is interposed radially between the guide hole and the rear section of the screw.

The present invention seeks to provide a solution to this problem and to address the previously mentioned disadvantages.

DESCRIPTION OF THE INVENTION

To this end, the invention proposes an arrangement containing:
 a brake piston, for the operation of at least one disk brake pad that contains a front transverse wall having a radial orientation and a lateral cylindrical tubular wall that extends axially towards the rear; and
 a nut-and-screw unit for the axial thrusting of the piston, from the rear to the front, that contains:
  a nut that is arranged in the interior of the piston, in relation to which it is secured in order to prevent rotation, and in which it is mounted so as to slide axially, the front axial end face of which interacts with an internal section facing the front wall of the piston in order to push the piston axially towards the front when the screw is driven in a rotating manner in the direction of unscrewing;

a screw containing a front section that is mounted screwed into the nut, an intermediate radial axial abutment flange delimited by a rear transverse face, and a rear section, characterized in that the piston and the screw contain means of centering that interact with one another when the screw is in a predetermined front axial position (referred to as the mounting position) in relation to the nut and to the piston in order to center the rear section of the screw radially in relation to the piston.

According to other characteristics of the arrangement:
the means of centering contain a front convex portion of the intermediate flange and a supplementary rear concave portion of the piston;
the supplementary portions are truncated cones;
the supplementary portions are truncated spheres;
the supplementary portions are truncated cylinders;
the rear concave portion of the piston is formed at the rear axial extremity of the lateral wall of the piston;
the arrangement contains abutment means that determine the axial mounting position of the screw in relation to the nut;
the abutment means are means of angular abutment that determine a maximum angular position of screwing of the screw in relation to the nut;
the means of angular abutment contain a finger of the intermediate flange and a supplementary notch formed at the rear axial extremity of the nut.

The invention also proposes a hydraulic disk brake for an electromechanical parking brake, containing at least one rear housing, inside which there is formed a cylindrical cavity that is open axially towards the front and is delimited axially towards the rear by a transverse bottom wall having radial orientation, characterized in that the cavity houses an arrangement according to the invention, of which the brake piston is mounted so as to slide in a sealed manner in a bore in the cavity, and in that the bottom wall of the housing contains a transcurrent opening for guiding the rear section of the screw in a rotatable manner.

According to other characteristics of the disk brake:
it contains an axial guide ring that is interposed radially between the guide hole and the rear section of the screw and is realized from a material having a low coefficient of friction;
it contains an annular seal that is interposed radially between the guide hole and the rear section of the screw;
it contains a bearing interposed axially between the rear transverse face of the intermediate flange of the screw and an internal section facing the bottom wall of the cavity.

Finally, the invention proposes a method of mounting a hydraulic disk brake for an electromechanical parking brake, containing a rear housing, inside which there is formed a cylindrical cavity that is open axially towards the front, that houses an arrangement containing a brake piston mounted so as to slide in a sealed manner in a bore of the cavity and houses a nut-and-screw unit for providing axial thrust, from the rear to the front, of the brake piston, the piston and the screw containing means of centering that interact with one another when the screw is in a predetermined front axial position, known as the mounting position, in relation to the nut and to the piston in order to center the rear section of the screw radially in relation to the piston, characterized in that it contains stages consisting of:
assembling a brake piston, a nut and a screw in order to realize said arrangement;
adjusting the axial position of the screw in relation to the nut and to the piston in the said axial mounting position in such a way as to center the rear section of the screw radially in relation to the piston;
introducing the previously adjusted arrangement, from the front to the rear, axially into the cavity of the housing;
securing the rear section of the screw axially in relation to the housing;
unscrewing the screw in relation to the nut.

BRIEF DESCRIPTION OF THE DRAWINGS

Other characteristics and advantages of the invention will become apparent from reading the following detailed description of an illustrative embodiment of the invention, for which reference should be made to the accompanying drawings, in which.

DETAILED DESCRIPTION OF THE DRAWINGS

In the description that follows, identical, analogous or similar elements and component parts are designated by the same references.

Depicted in the figures is a disk brake 10, which is depicted here without its brake pads, and also without the associated means for guiding and returning these pads in axial displacement.

Figure 1:
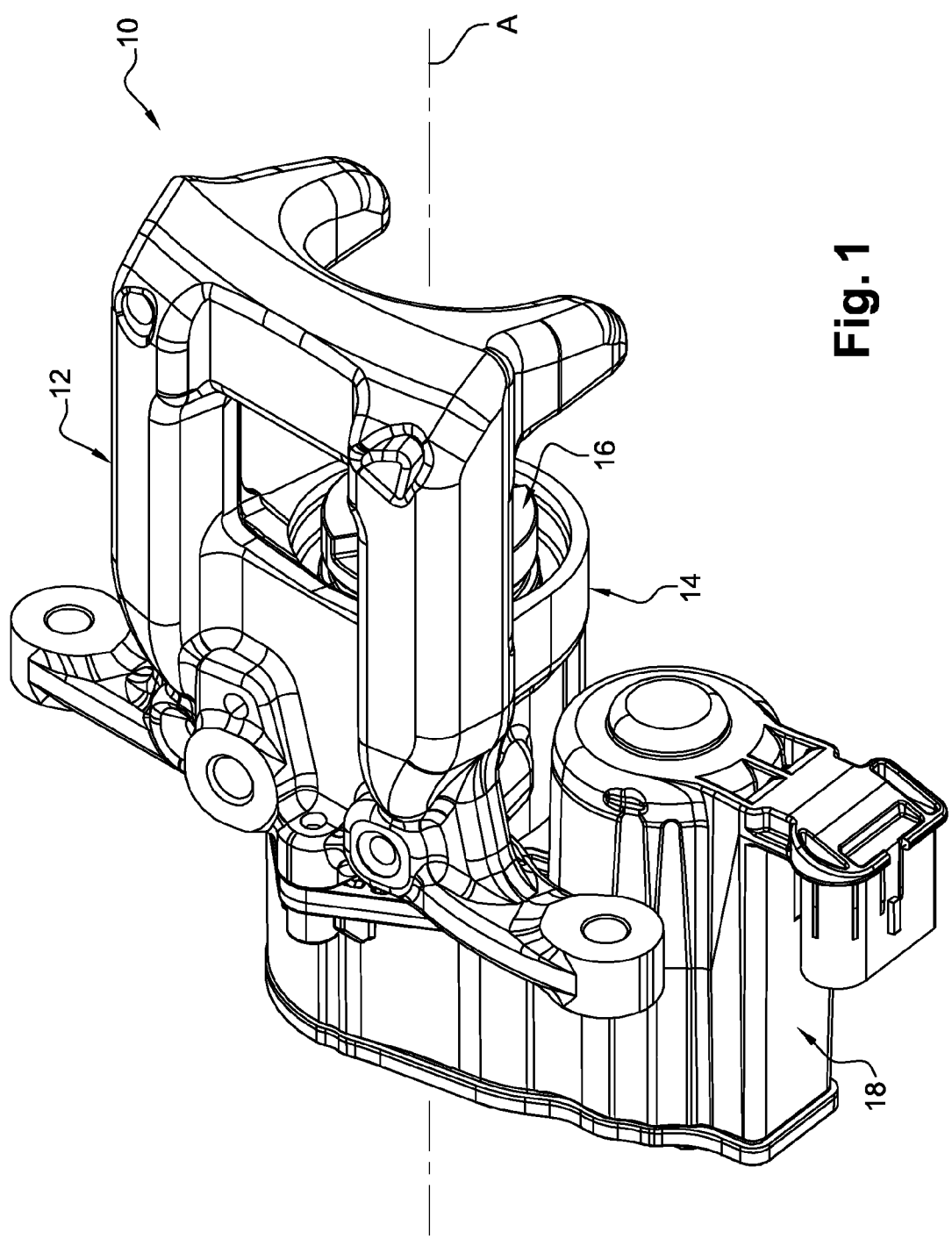
FIG. 1 is a general perspective view of a disk brake for a parking brake according to the invention.

The disk brake 10 consists essentially of a caliper 12 containing a rear housing 14, in which a hydraulic brake piston 16 is mounted so as to slide axially from the rear to the front, that is to say from the left towards the right, as shown in FIG. 1, according to an axis A.

By way of example, the disk brake 10 in this case contains, at the rear, a geared motor unit 18 with an electric motor and a reduction gear that is additional and is fixed to a rear transverse face 20 of the caliper 12, in this case by means of axial screws 22.

Figure 2:
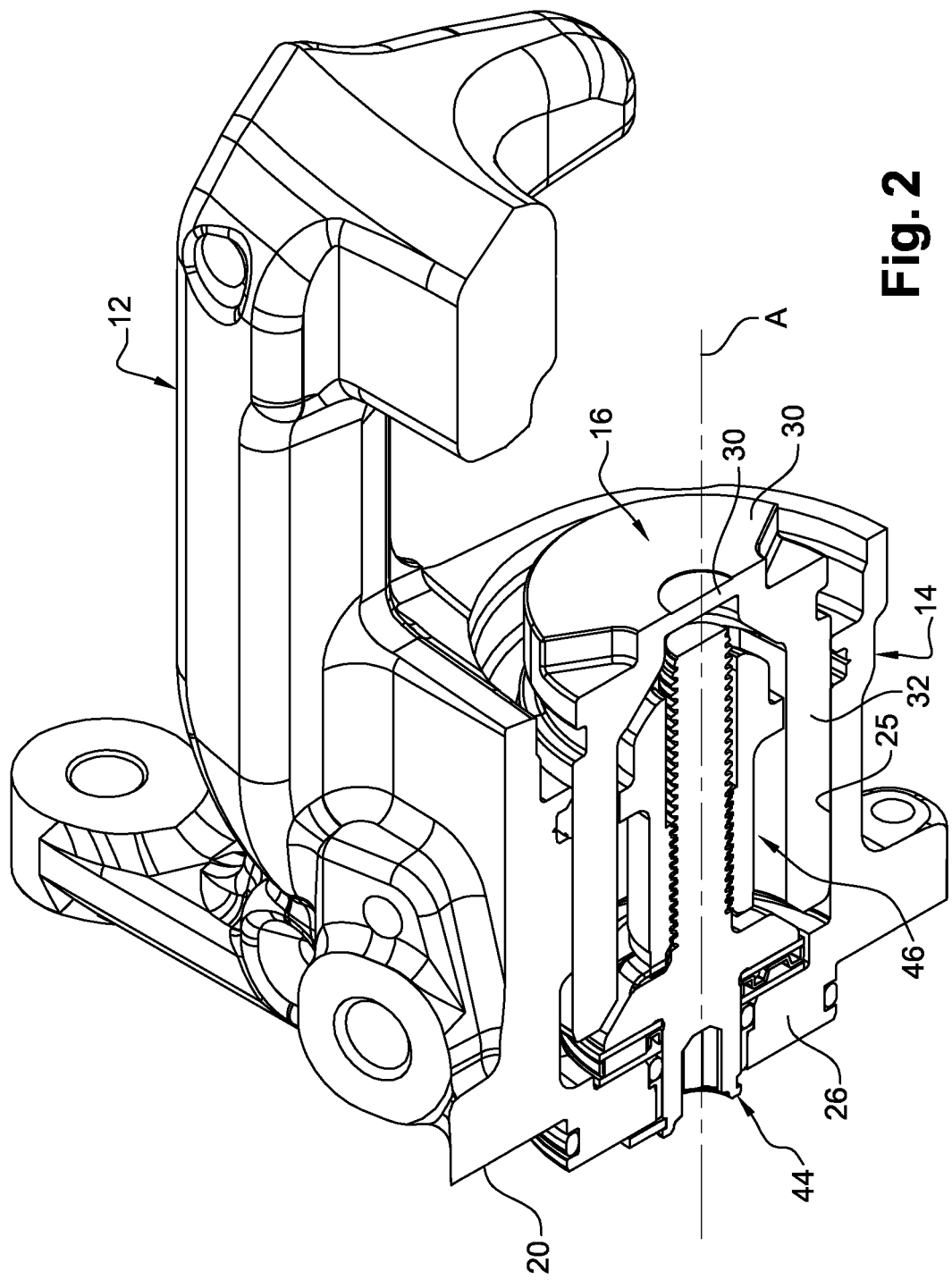
FIG. 2 is a similar view to that in FIG. 1, in which a part of the disk brake is depicted in cross section through an axial plane.
Figure 3:
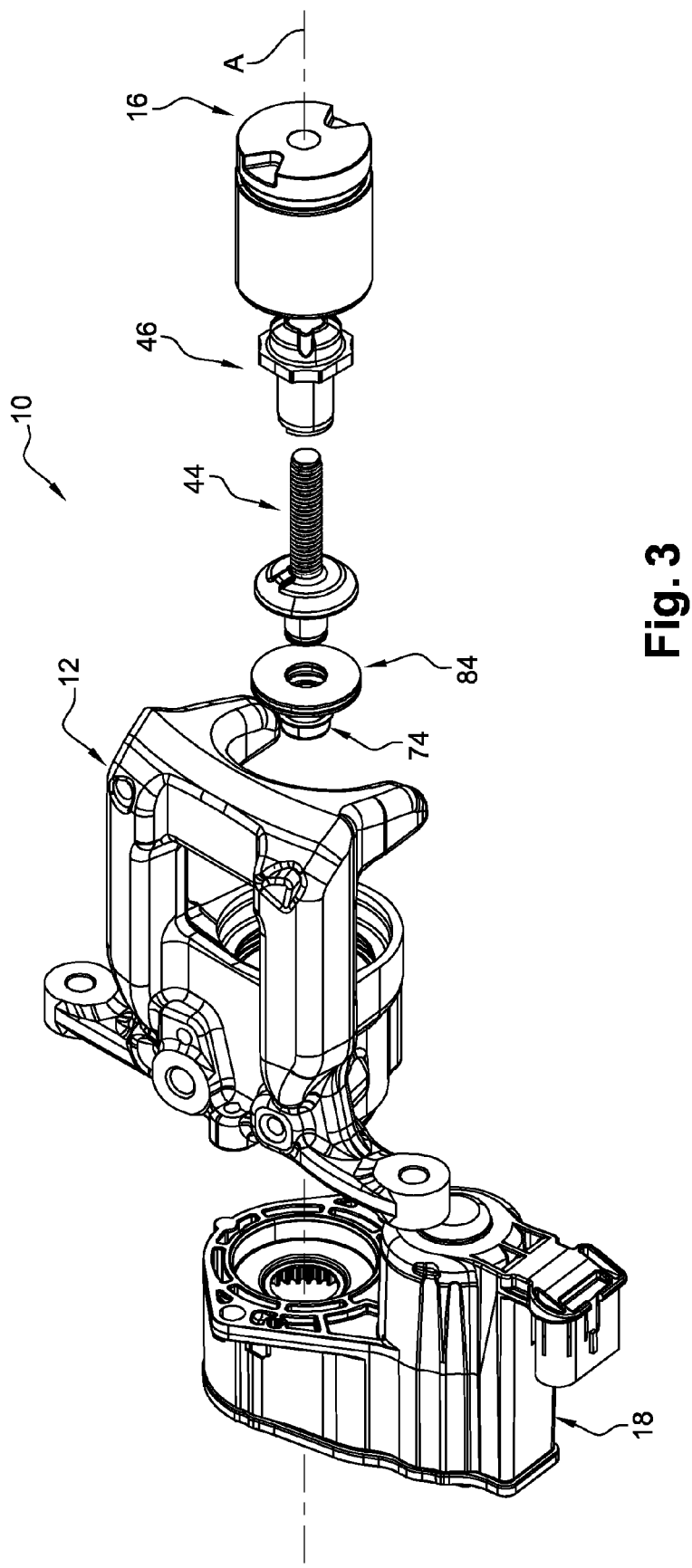
FIG. 3 is a similar view to that in FIG. 1, which represents the principal elements and component parts of the disk brake in an exploded view.
Figure 4:
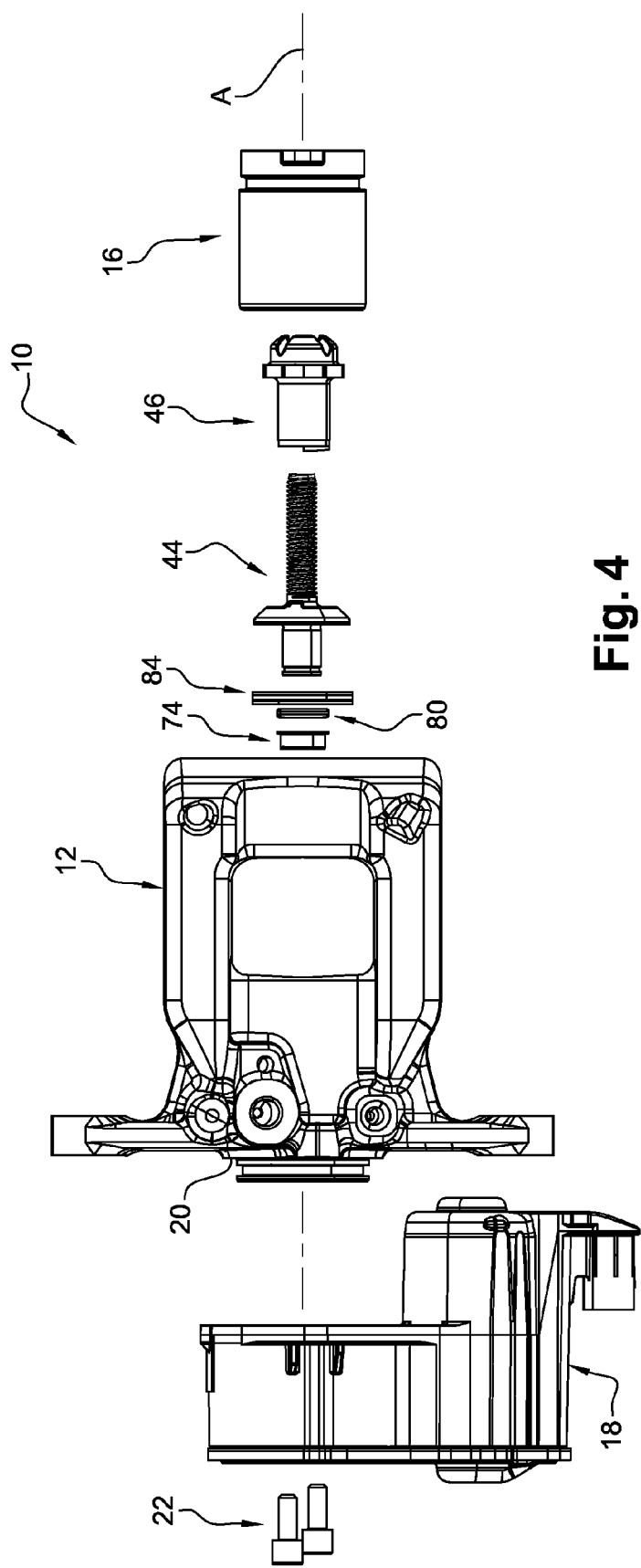
FIG. 4 is a top view of FIG. 3.
Figure 5:
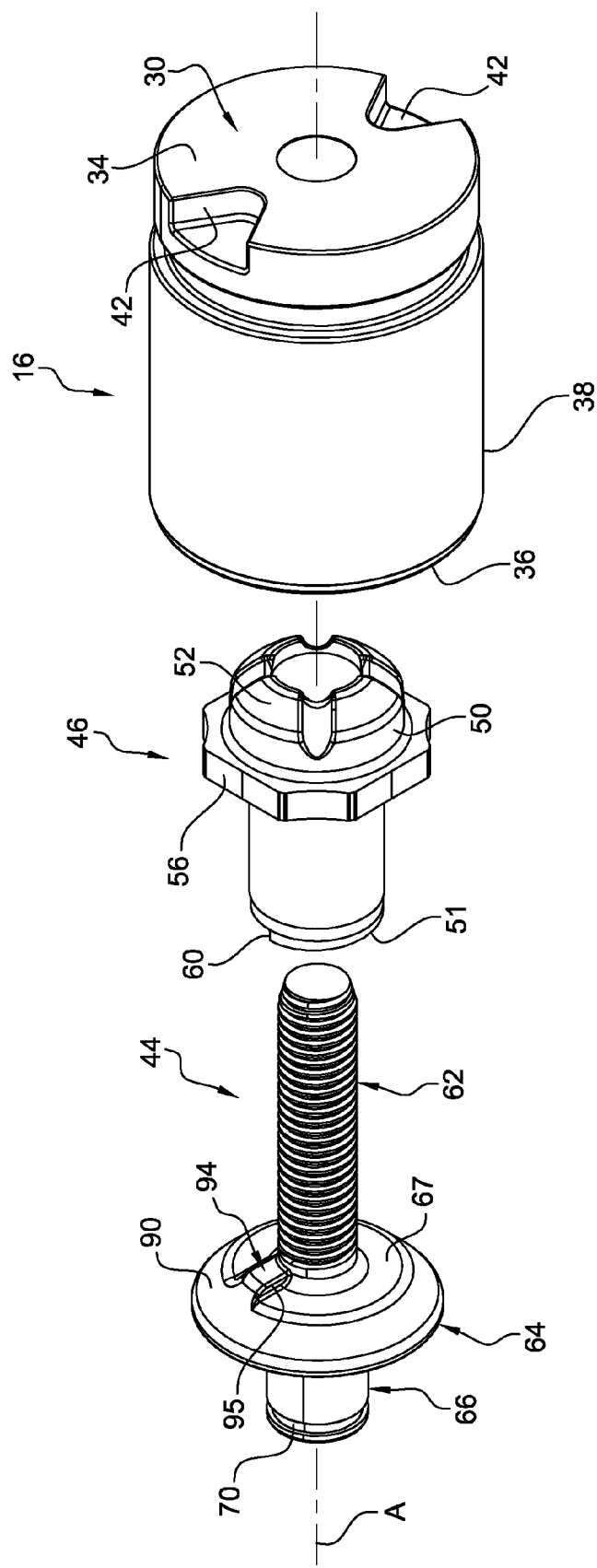
FIG. 5 is a detailed view on a larger scale which represents, in an exploded perspective, the three principal component parts of the arrangement comprising the piston and the nut-and-screw unit of the disk brake in FIGS. 1 to 4.
Figure 6:
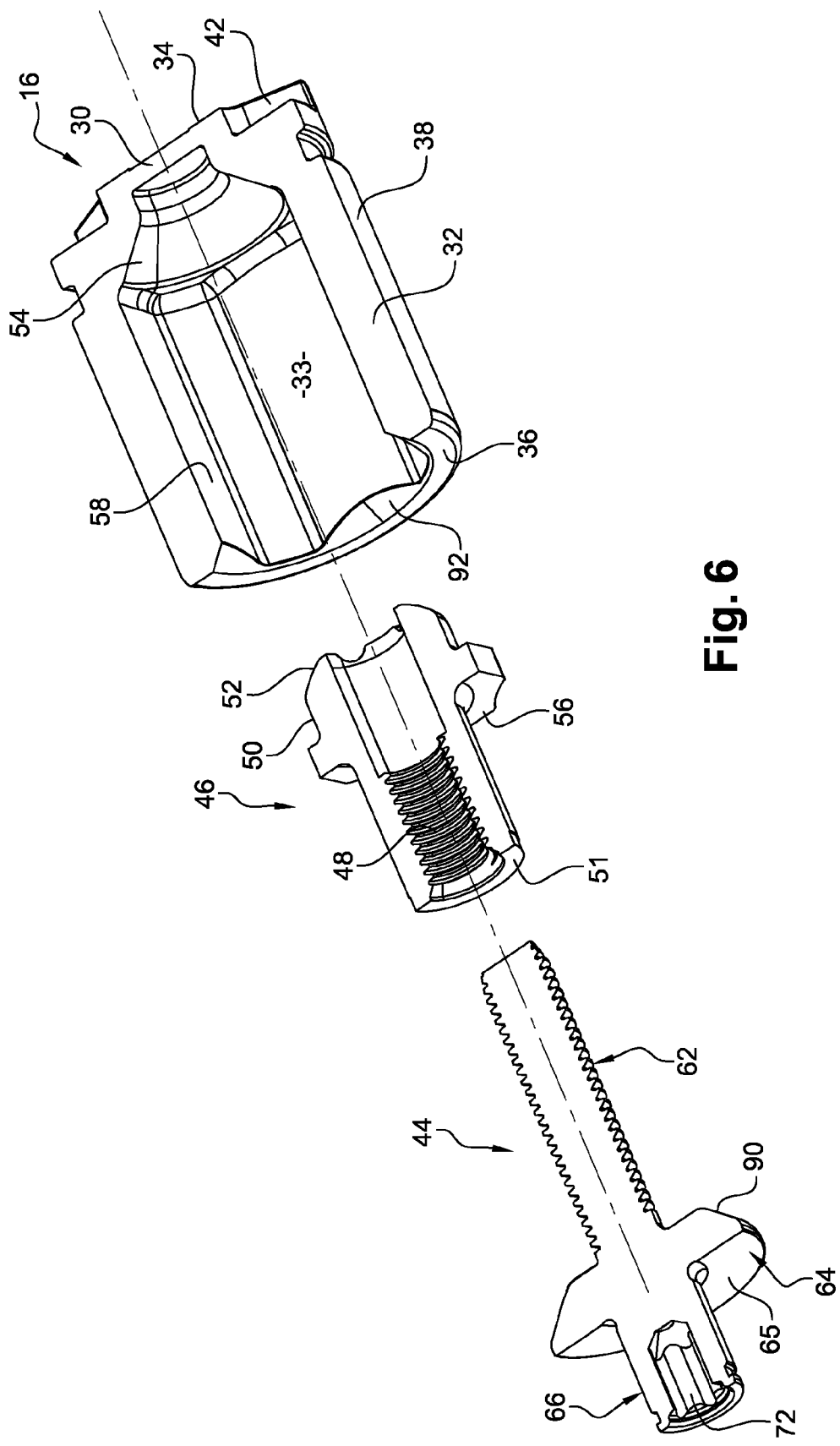
FIG. 6 is a partially cut-away perspective view passing through an axial plane of the elements depicted in FIG. 5.
Figure 7:
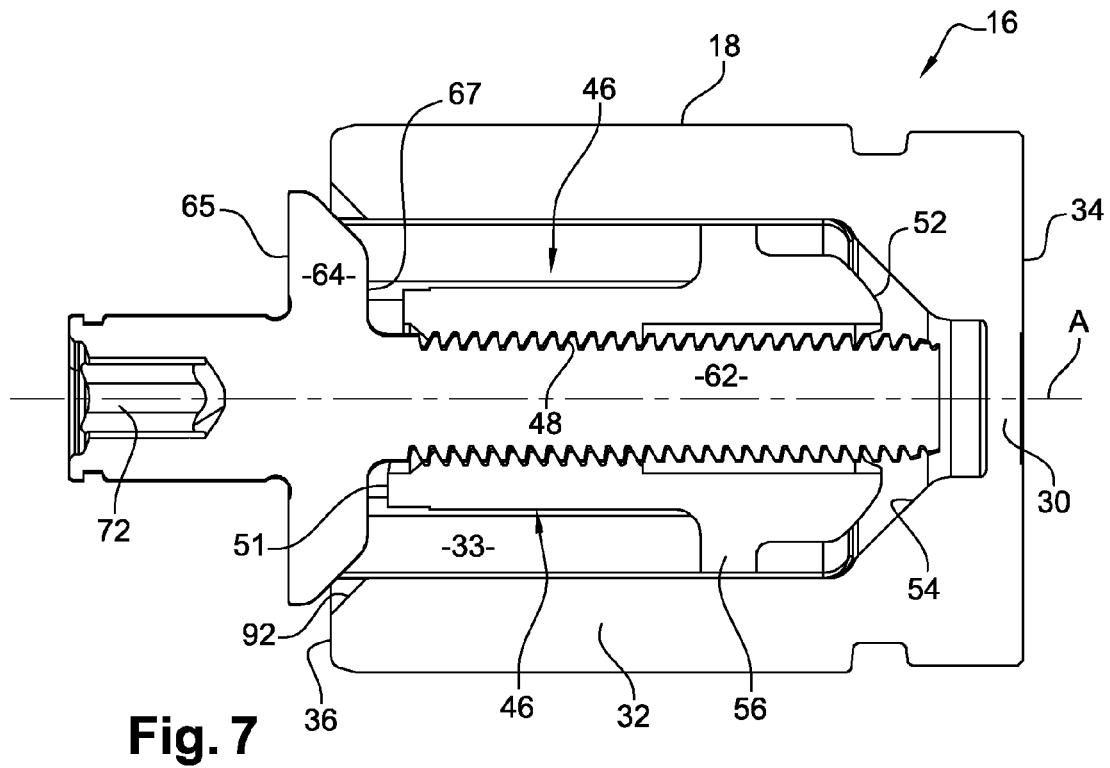
FIG. 7 is a view in axial section on a large scale and in the assembled position of the three component parts of FIG. 5.
Figure 10:
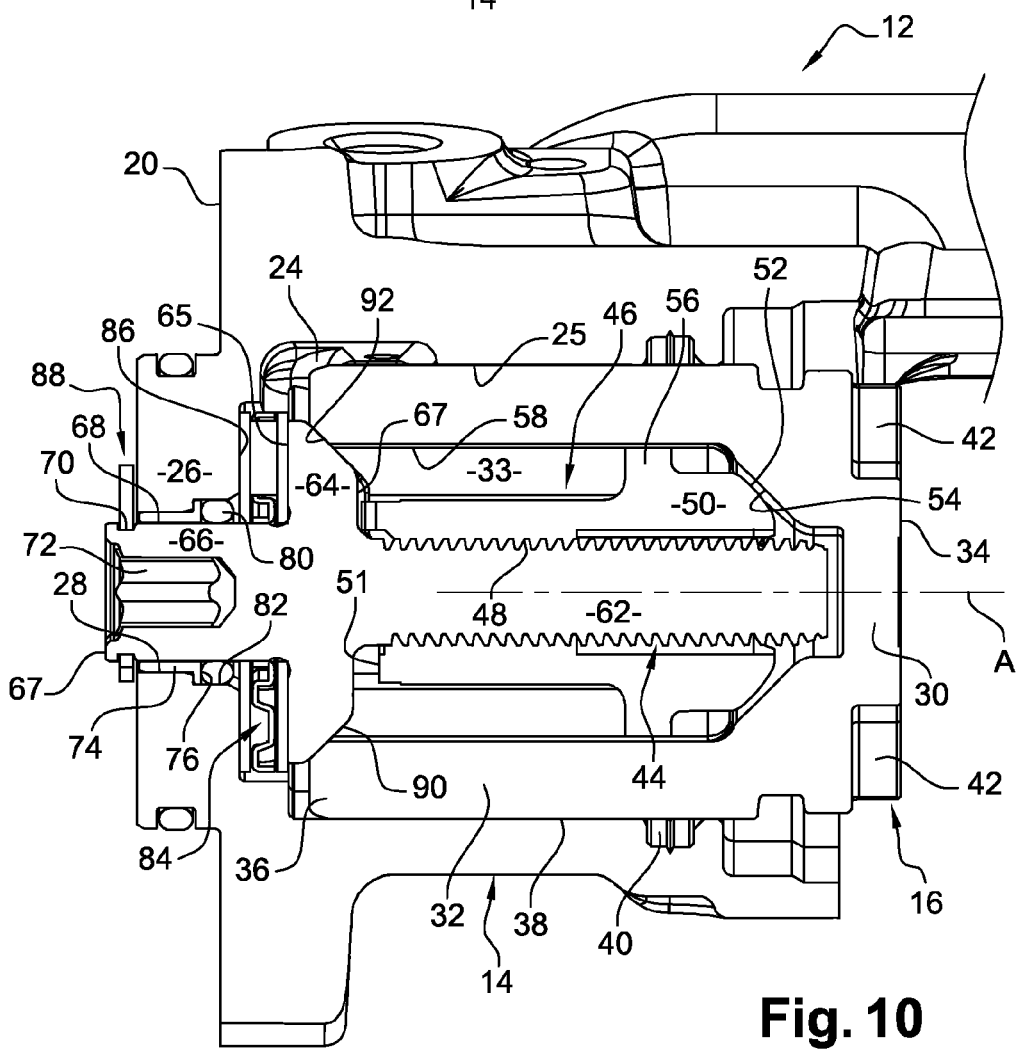
FIG. 10 is a view in axial cross section, similar to that in FIG. 2, representing on a large scale the arrangement comprising the brake piston and the nut-and-screw unit in a position known as the mounting position and mounted in the caliper of the disk brake.

As can be appreciated in particular from FIGS. 2 and 10, the rear housing 14 is a part that is cast in a foundry, for example in a light alloy, which delimits an axial hydraulic cavity 24 in a machined bore 25, the piston 16 of which is mounted so as to slide axially in both directions, according to the axis A.

The hydraulic cavity 24 is delimited axially towards the rear by a transverse bottom wall 26 having a radial orientation that is pierced centrally by an axial transcurrent opening 28.

The cavity 24 is open axially towards the front in such a way that the piston 16 is able to protrude axially from the housing 14 in order to interact, in a known manner, with an associated brake pad (not depicted here).

For this purpose, the brake piston 16 is a component having the general form of a cylindrical cup that contains a front transverse wall 30, having a radial orientation, that extends axially towards the rear through a lateral cylindrical tubular wall 32.

The external transverse face 34 of the front wall 30 of the piston 16 is capable of interacting with the associated disk brake pad (not depicted here).

The lateral cylindrical tubular wall 32 is delimited towards the rear by a rear transverse annular face 36.

The piston 16 thus delimits an internal cavity 33 that is open axially towards the rear.

The lateral radially external convex cylindrical wall 38 of the piston 16 is guided in axial displacement in the bore 25 of the cavity 24, and the tightness is assured by means of an annular seal (not depicted here), for example, having a square or rectangular section, received in a radial groove 40 in the bore 25.

The means of securing the piston 16 against rotation in relation to the caliper 12 in this case contain notches 42 formed in the external face 34 of the piston 16 that interact with supplementary means (not depicted here).

In a known manner, the supply of the chamber 24 with hydraulic fluid under pressure produces a hydraulic operation of the brake by axial thrusting towards the front of the piston 16 in relation to the rear housing 14 of the caliper 12.

For the mechanical operation of the piston 16 in a function referred to as parking or "parking", the piston 16 and the chamber 24 house a nut-and-screw unit containing a rear driving screw 44 and a front nut 46 for providing axial thrust.

The nut 46 is of generally tubular shape, and it is traversed axially and centrally by a tapped hole 48.

The nut is delimited axially towards the rear by a rear transverse annular end face 51.

In the vicinity of its front extremity, the nut 46 contains a front part 50 having a larger external diameter that is delimited by a front thrust face 52 exhibiting a convex revolution profile in the form of a truncated sphere.

The front face 52 of the nut 46 is capable of interacting with a facing internal section 54 of the piston 16, in this case being a revolution portion in the form of a truncated cone centered on the axis A.

In order to secure the nut 46 against rotation in the interior of the piston 16, the nut 46 contains a radial flange 56 having a polygonal contour, and the internal cavity 33 of the piston 16 is delimited by a supplementary concave polygonal wall 58.

The flange 56, together with the nut 46, is thus capable of sliding axially with a clearance inside the cavity 33, although it is secured against rotation in the interior of the piston 16.

The rear annular end face 51 of the nut 46 contains an abutment notch 60, the function of which is explained below.

The axial thrusting screw 44 contains, running axially from the front to the rear, a front section 62 that is threaded externally and is mounted screwed into the tapping 48 of the axial thrusting nut 46.

The screw further contains an intermediate abutment flange 64 that extends radially towards the exterior and is delimited axially towards the rear by a transverse abutment face 65 having radial orientation, which face is machined.

Finally, the screw contains a rear section 66 that extends axially towards the rear from the transverse face 65 and is delimited by its lateral cylindrical convex machined face 68.

In the vicinity of its rear extremity, the rear section 66 contains a radial groove 70.

For the purpose of driving the screw 44 in a rotatable manner in the two directions, the rear section 66 is also configured as a driving head and in this case it contains, to that end, an internally hollow form 72 that is capable of receiving a shaft of supplementary form for its driving in a rotatable manner.

The rear section 66 of the screw 44 is the section for guiding the screw 44 in a rotatable manner in relation to the housing 14 of the caliper 12, and to that end it is received and guided in a rotatable manner in an axial hole 28 in the caliper that it traverses axially in this case with the interposition of a ring for guidance in a rotatable manner 74 that is realized in a material having a low coefficient of friction, for example, in bronze.

The function of the ring 74 is to guide the rear section 66 of the screw 44 rotatably in a precise manner by ensuring in particular the coaxiality of the screw 44 of the piston 26 and of the bore 25, and to reduce the friction between the rear section 66 and the bottom wall 26 of the housing 14.

The guide ring 74 presents an L-shaped profile and it is delimited axially towards the front by a transverse face 76, in abutment against which is an annular seal 80 that is housed in a complementary front section of the transcurrent opening 28 of greater diameter 82.

In a known manner, a bearing 84 (in this case with radial roller bearings) is interposed axially between the rear transverse face 65 of the radial flange 64 of the screw 44 and an internal machined section 86 facing the internal face of the rear bottom wall 26 of the housing 14 that delimits the hydraulic chamber 24 axially.

In the mounted and assembled position of the piston 16 and of the nut-and-screw unit 44-46, as can be appreciated in particular in FIGS. 2 and 10, the screw 44 is secured axially without a clearance in relation to the bottom wall 26 by means of a split elastic ring or "circlip" 88, that is received in the groove 70 of the rear section 66 of the screw 44.

As has already been explained in the preamble, when the assembly and the mounting are realized by the axial introduction of the piston 16 that houses the nut 46 and of the screw 44, the rear part of which projects axially from the piston 16 beyond its rear transverse end face 36, a rear transverse end face 67 of the section 66 is likely, according to the prior art, not to be perfectly aligned axially with the hole 28 and the ring 74, and it runs the risk of coming into abutment against the internal machined face 86 (at the risk of blocking the assembly and causing this face 86 to be damaged), and/or against the seal 80 and/or the ring 74 at the risk of blocking the assembly operations and/or of causing these components to be damaged.

According to the invention, means are proposed for the radial centering of the screw 44 in relation to the piston 16 and accordingly for the centering of the rear section 66 of the screw 44 in relation to the piston in order to ensure a coaxiality of this section 66 in relation to the piston 16, and this in a temporary manner during the mounting and assembly operations of the disk brake.

For this purpose, and by way of non-limiting example, the means of centering are means of centering through the interaction of supplementary shapes that interact between one another, between the screw and the piston, when the screw 44 occupies a predetermined front axial position, known as the mounting position, in relation to the piston 16.

According to the embodiment illustrated in the figures, the means of centering in this case are constituted by a front convex portion of the radial flange 64 of the screw 44 and by a supplementary rear concave portion of the piston 16.

More specifically, the front transverse face of the flange 64 is configured in the form of a convex truncated cone that delimits a remote front convex frustoconical surface 90 that is centered axially on the axis of the screw 44.

In a complementary manner, the rear annular end face 36 of the lateral tubular wall 32 of the piston 16 extends radially towards the interior via a concave truncated cone that delimits a supplementary rear concave frustoconical surface 92 of the frustoconical seat 90.

Figure 8:
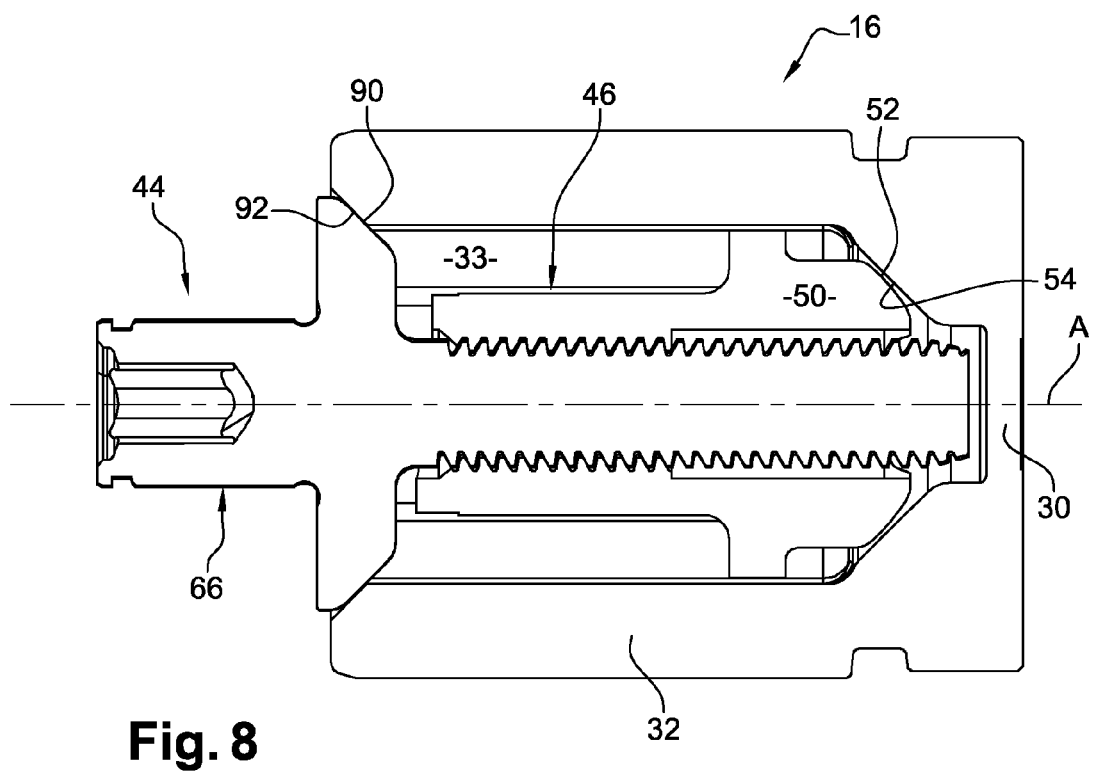
FIG. 8 is a similar view to that in FIG. 7, in which the three component parts are depicted in the position known as the mounting position according to the invention.
Figure 9:
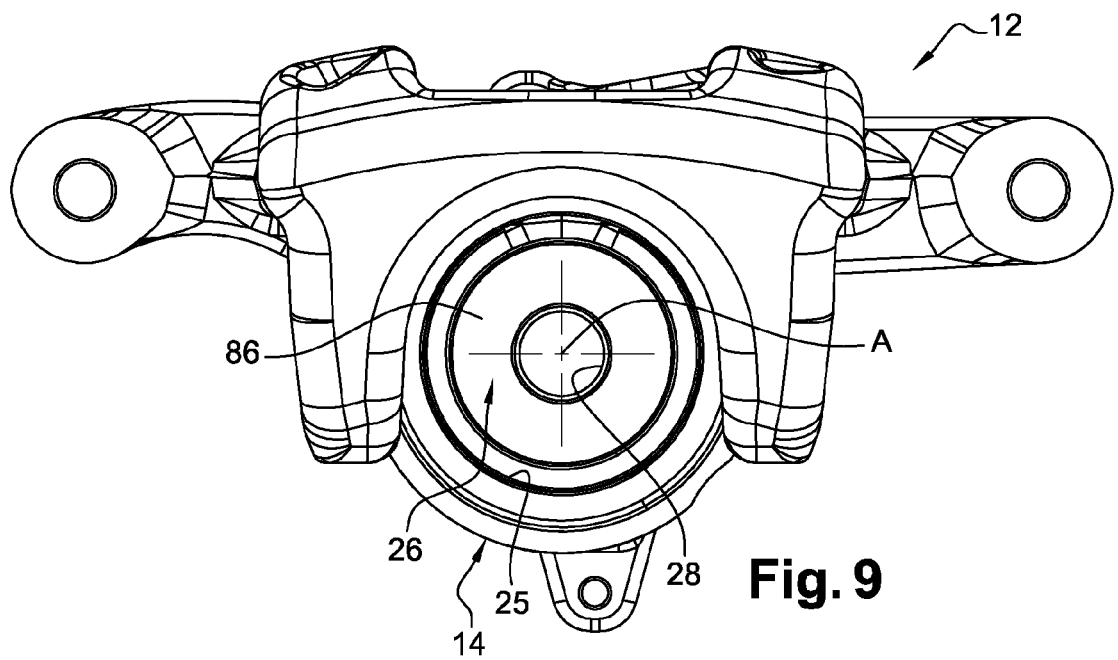
FIG. 9 is an axial end view, from the front, of the caliper of the disk brake depicted in FIG. 3.

As can be appreciated in particular in FIG. 8, when the screw 44 is in its predetermined axial mounting position in relation to the piston 16, the convex 90 and concave 92 supplementary seating surfaces are in axial abutment, one against the other, and they ensure the radial centering of the flange 64, and accordingly that of the screw 44, in relation to the piston 16.

Thus, by introducing the piston 16 together with the nut-and-screw unit 44-46 housed in the cavity 33 of the piston 16, into the bore 25, axially from the front to the rear, the guiding of the piston 16 in axial displacement inside the bore 25 at the same time ensures the axial alignment of the section 66 with the ring 74 that is present in the transcurrent opening 28 and accordingly permits the axial introduction, free from any defects of eccentricity, of the section 66 through the bottom wall 26 in order to arrive at the mounting and assembly position illustrated in particular in FIG. 10.

In order to determine the axial mounting position illustrated in FIG. 8, and in particular in order to prevent the surfaces 52 of the nut 46 and 54 of the piston 16 from being in axial abutment and as a result resisting making contact between the seating surfaces 90 and 92, abutment means are provided between the nut 46 and the screw 44.

The abutment means in this case are means of angular abutment that comprise an abutment finger 94 projecting axially towards the front from the central part of the front face 67 of the flange 64.

The means of angular abutment also contain the supplementary notch 60 formed at the rear axial extremity of the nut 46.

Placing in the predetermined mounting position is achieved in this case by screwing the screw 44 into the nut 46 until a lateral face 95 of the abutment finger 94 comes into angular abutment against the notch 60.

After mounting and assembly, unscrewing of the screw 44 in relation to the nut 46 causes separation by the axial distancing of the supplementary frustoconical centering seats and by the onset of interaction between the thrust surfaces 52 and 54 for the purpose, for example, of the mechanical operation of the piston 16 by driving, to that end and in a known manner, the screw 44 in a rotational manner in the direction of unscrewing by means of the geared motor unit 18 and its output shaft (not depicted here) received in the housing 72 of the rear section 66 of the screw 44.

The screw thread between the tapped nut 46 and the front threaded section 62 of the screw 44 is irreversible in order to maintain the brake in its tightened state, or its applied state, for as long as the direction of rotation of the screw is not inverted in order to bring about its release.

The said electromechanically operated parking brake may also be utilized advantageously as an emergency brake.

The invention is not restricted to the previously described embodiments, in particular as regards the solution according to the invention relative to the design of the means for radially centering the rear section 66 of the screw 44 in relation to the piston 16.

As an alternative (not depicted here), it is possible in particular to propose supplementary sections for centering in the form of truncated spheres or even supplementary truncated cylinders or sections of a cylinder of very short axial length.

Thus, all associated supplementary forms of a revolution profile that are likely temporarily to occupy a position, known as the mounting position, for the centering of the rear section 66 of the screw 44 in relation to the piston 16 may be utilized without departing from the scope of the present invention.

The invention is not restricted to driving the screw in a rotatable manner by means of a geared motor unit with an electric motor and a reduction gear. As an alternative (not depicted here), the rear section of the screw may be driven in a rotatable manner by a belt, advantageously by a toothed belt, or by a mechanism of transmission by a lever(s), by cable or similar transmission mechanism.

The invention claimed is:

1. An arrangement comprising:
a brake piston configured to operate at least one disk brake pad, the brake piston including a front transverse wall having a radial orientation and a lateral cylindrical tubular wall that extends axially towards a rear; and
a nut-and-screw unit for the axial thrusting of the piston, from the rear to a front, the nut-and-screw unit comprising:
a nut that is disposed in the interior of the piston, the nut being secured to the piston in order to prevent rotation, the nut being mounted in the piston to slide axially, the front axial end face of the nut interacting with an internal section facing the front wall of the piston, in order to push the piston axially towards the front when a screw of the nut-and-screw unit is driven in a rotating manner in a direction of unscrewing, and
the screw including a front section that is mounted screwed into the nut, an intermediate radial flange delimited by a rear transverse face, and a rear section,
wherein the piston and the screw include means for centering that includes two centering portions that interact with one another when the screw is in a predetermined front axial mounting position, in relation to the nut and to the piston in order to center the rear section of the screw radially in relation to the piston, the two centering portions including a supplementary front portion of the intermediate flange and a supplementary rear portion of the piston, the rear portion of the piston being disposed at a rear axial transversal extremity face of the lateral wall of the piston, the supplementary portions being truncated cones.

2. The arrangement as claimed in claim 1, further comprising abutment means configured to determine the axial mounting position of the screw in relation to the nut.

3. The arrangement as claimed in claim 2, wherein the abutment means are means for angular abutment that determine a maximum angular position of screwing of the screw in relation to the nut.

4. The arrangement as claimed in claim 3, wherein the means for angular abutment include a finger of the intermediate flange and a supplementary notch formed at the rear axial extremity of the nut.

5. An arrangement comprising:
a brake piston configured to operate at least one disk brake pad, the brake piston including a front transverse wall having a radial orientation and a lateral cylindrical tubular wall that extends axially towards a rear; and a nut-and-screw unit for the axial thrusting of the piston, from the rear to a front, the nut-and-screw unit comprising:
- a nut that is disposed in the interior of the piston, the nut being secured to the piston in order to prevent rotation, the nut being mounted in the piston to slide axially, the front axial end face of the nut interacting with an internal section facing the front wall of the piston, in order to push the piston axially towards the front when a screw of the nut-and-screw unit is driven in a rotating manner in a direction of unscrewing, and
- the screw including a front section that is mounted screwed into the nut, an intermediate radial flange delimited by a rear transverse face, and a rear section, wherein the piston and the screw include means for centering that includes two centering portions that interact with one another when the screw is in a predetermined front axial mounting position, in relation to the nut and to the piston in order to center the rear section of the screw radially in relation to the piston, the two centering portions including a supplementary front portion of the intermediate flange and a supplementary rear portion of the piston, the rear portion of the piston being disposed at a rear axial transversal extremity face of the lateral wall of the piston, the supplementary portions being truncated spheres.

6. A hydraulic disk brake for an electromechanical parking brake, the disk brake comprising:
   at least one rear housing, inside of which is formed a cylindrical cavity that is open axially towards the front and is delimited axially towards the rear by a transverse bottom wall having radial orientation,
   wherein the cavity houses the arrangement as claimed in claim 1, the brake piston being mounted to slide in a sealed manner in a bore in the cavity, the bottom wall of the housing including a transverse opening configured to guide the rear section of the screw in a rotatable manner.

7. The disk brake as claimed in claim 6, further comprising an axial guide ring interposed radially between the guide hole and the rear section of the screw and being made from a material having a low coefficient of friction.

8. The disk brake as claimed in claim 6, further comprising an annular seal that is interposed radially between the guide hole and the rear section of the screw.

9. The disk brake as claimed in claim 6, further comprising a bearing interposed axially between the rear transverse face of the intermediate flange of the screw and an internal section facing the bottom wall of the cavity.

10. The disk brake as claimed in claim 7, further comprising an annular seal that is interposed radially between the guide hole and the rear section of the screw.

11. The disk brake as claimed in claim 7, further comprising a bearing interposed axially between the rear transverse face of the intermediate flange of the screw and an internal section facing the bottom wall of the cavity.

12. The disk brake as claimed in claim 8, further comprising a bearing interposed axially between the rear transverse face of the intermediate flange of the screw and an internal section facing the bottom wall of the cavity.

13. A method of mounting a hydraulic disk brake for an electromechanical parking brake, the method comprising:
   providing the disk brake including a rear housing inside of which is formed a cylindrical cavity that is open axially towards a front, the cavity housing an arrangement including a brake piston mounted to slide in a sealed manner in a bore of the cavity and housing a nut-and-screw unit configured to provide axial thrust of the brake piston, from the rear to a front, the piston and the screw including means for centering that includes two centering portions that interact with one another when the screw is in a predetermined front axial mounting position, in relation to the nut and to the piston in order to center the rear section of the screw radially in relation to the piston, the two centering portions including a supplementary front portion of the intermediate flange and a supplementary rear portion of the piston, the rear portion of the piston being disposed at a rear axial pg,24 transversal extremity face of the lateral wall of the piston, the supplementary portions being truncated cones;
   assembling the brake piston, the nut, and the screw in order to form the arrangement;
   adjusting the axial position of the screw in relation to the nut and to the piston in the axial mounting position to center the rear section of the screw radially in relation to the piston;
   introducing the previously-adjusted arrangement, from the front to the rear, axially into the cavity of the housing; pg,25
   securing the rear section of the screw axially in relation to the housing; and unscrewing the screw in relation to the nut.

\* \* \* \* \*